United States Patent
Lee et al.

(10) Patent No.: US 9,377,062 B2
(45) Date of Patent: Jun. 28, 2016

(54) CLUTCH CHARACTERISTIC ADJUSTING METHOD FOR DCT

(71) Applicants: Hyundai Motor Company, Seoul (KR); Kia Motors Corporation, Seoul (KR)

(72) Inventors: Ho Young Lee, Bucheon-si (KR); Joung Chul Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 14/329,674

(22) Filed: Jul. 11, 2014

(65) Prior Publication Data

US 2015/0167754 A1 Jun. 18, 2015

(30) Foreign Application Priority Data

Dec. 17, 2013 (KR) .................. 10-2013-0157635

(51) Int. Cl.
*B60W 10/02* (2006.01)
*B60W 10/04* (2006.01)
*F16D 48/06* (2006.01)

(52) U.S. Cl.
CPC ............. *F16D 48/06* (2013.01); *F16D 48/062* (2013.01); *F16D 2500/30406* (2013.01); *F16D 2500/30412* (2013.01); *F16D 2500/30421* (2013.01); *F16D 2500/30423* (2013.01); *F16D 2500/50236* (2013.01); *F16D 2500/50296* (2013.01); *F16D 2500/70252* (2013.01); *F16D 2500/70264* (2013.01)

(58) Field of Classification Search
CPC ............ F16D 2500/50236; F16D 2500/70264; F16D 2500/70605
See application file for complete search history.

(56) References Cited

U.S. PATENT DOCUMENTS

| 4,943,920 | A | * | 7/1990 | Hiramatsu | ............ | F16H 61/061 |
| | | | | | | 192/3.58 |
| 5,600,194 | A | * | 2/1997 | Toukola | ............... | H02K 49/065 |
| | | | | | | 310/105 |
| 2013/0018556 | A1 | * | 1/2013 | Williams | ................ | F16D 48/06 |
| | | | | | | 701/60 |
| 2013/0317683 | A1 | * | 11/2013 | Terakawa | ................ | B60K 6/48 |
| | | | | | | 701/22 |

FOREIGN PATENT DOCUMENTS

| JP | 2003-202074 A | 7/2003 |
| JP | 2006-292007 A | 10/2006 |
| JP | 2011-202749 A | 10/2011 |
| JP | 2013-36484 A | 2/2013 |
| KR | 1020040048397 A | 6/2004 |
| KR | 1020090061752 A | 6/2009 |
| KR | 1020090114933 A | 11/2009 |

* cited by examiner

*Primary Examiner* — Tisha Lewis

(74) *Attorney, Agent, or Firm* — Morgan, Lewis & Bockius LLP

(57) ABSTRACT

A method of correcting a clutch characteristic of a DCT may include a torque situation determining step that determines whether a torque is applied to any one or both of a first clutch and a second clutch, a slip determining step that determines whether an amount of slip of a clutch receiving the torque is equal to or more than a predetermined reference value, and a correcting step that corrects a T-S curve of the clutch in accordance with situations determined in the torque situation determining step, if the amount of slip of the clutch is equal to or more than the predetermined reference value.

4 Claims, 5 Drawing Sheets

CLUTCH CHARACTERISTIC ADJUSTING METHOD FOR DCT

CROSS-REFERENCE TO RELATED APPLICATION

The present application claims priority of Korean Patent Application Number 10-2013-0157635 filed on Dec. 17, 2013, the entire contents of which application are incorporated herein for all purposes by this reference.

BACKGROUND OF INVENTION

1. Field of Invention

The present invention relates to a method for correcting a clutch characteristic of a DCT, and more particularly, to a method for correcting a clutch characteristic in consideration of energy that is applied to a clutch.

2. Description of Related Art

Automated manual transmissions such as an AMT (automated manual transmission) or a DCT (double clutch transmission), systems automatically controlling the shifting mechanism of manual transmissions, are usually configured to transmit engine torque to the shifting mechanism, using a dry clutch, unlike common A/Ts that use a torque converter and a wet multi-plate clutch.

Such a dry clutch is controlled by an actuator and generally, the actuator is controlled by a T-S curve showing changes in transmission torque of the dry clutch to the stroke of the actuator.

Since the dry clutch has a characteristic that the transmission torque is largely changed by numerous factors such as allowances of the components, the degree of friction due to use, thermal deformation due to high temperature, and a change in friction coefficient of the disc, it is difficult to obtain data of the transmission torque of the dry clutch in a predetermined state.

However, the changes in characteristics of the transmission torque are not applied well in control of the dry clutch, so when the actuator is controlled too less or much, the clutch excessively slips or a shock is caused; therefore, it is required to find out the exact characteristics of the transmission torque of the dry clutch according to the stroke of the actuator and to use them in control of the actuator.

For reference, FIG. 1 is a view showing the clutch structure of a DCT where the present invention can be applied, in which a first clutch and a second clutch are disposed at both sides of a center plate 500 at the center, the first clutch includes a first clutch plate 502 pressed to the center plate 500 and receiving power and a first pressing plate 504 pressing the first clutch plate 502 to the center plate 500, the second clutch includes a second clutch plate 506 and a second pressing plate 508, the first pressing plate 504 presses the first clutch plate 502 to the center plate 500, as a first engaging bearing 510 moves to the left, and the second pressing plate 508 presses the second clutch plate 506 to the center plate 500, as a second engaging bearing 512 moves to the left.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method for correcting a clutch characteristic which can improve the durability of a clutch and the quality of shifting by ensuring more appropriate clutch transmission torque characteristics and preventing unnecessary slip or shock of two clutches, thereby making it possible to correct the transmission torque characteristics of the clutches in consideration of a change in the transmission torque characteristics of the clutches due to energy that is applied to the clutches.

Various aspects of the present invention provides a method of correcting a clutch characteristic of a DCT, which may include a torque situation determining step that determines whether a torque is applied to any one or both of a first clutch and a second clutch, a slip determining step that determines whether an amount of slip of a clutch receiving the torque is equal to or more than a predetermined reference value, and a correcting step that corrects a T-S curve of the clutch in accordance with situations determined in the torque situation determining step, if the amount of slip of the clutch is equal to or more than the predetermined reference value.

According to the present invention, it is possible to improve the durability of a clutch and the quality of shifting by ensuring more appropriate clutch transmission torque characteristics and preventing unnecessary slip or shock of two clutches, thereby making it possible to correct the transmission torque characteristics of the clutches in consideration of a change in the transmission torque characteristics of the clutches due to energy that is applied to the clutches.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
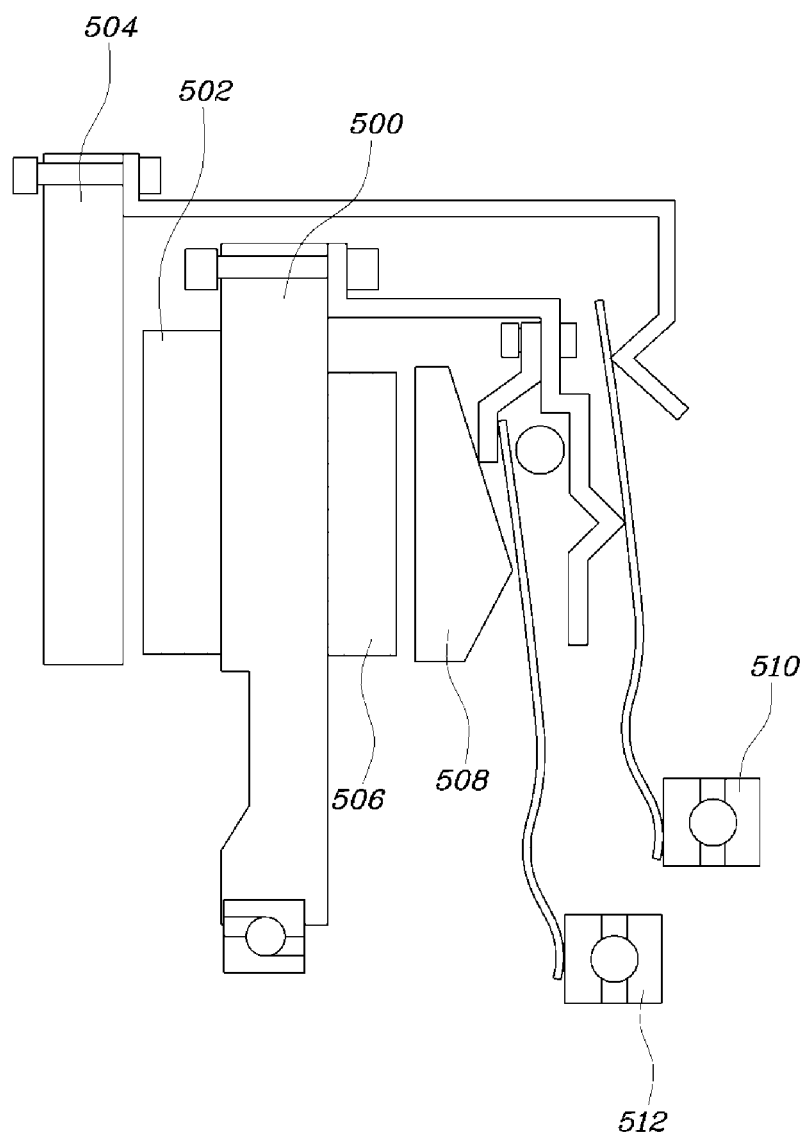
FIG. 1 is a conceptual view showing a clutch structure of a DCT of the related art to which the present invention can be applied.
Figure 2:
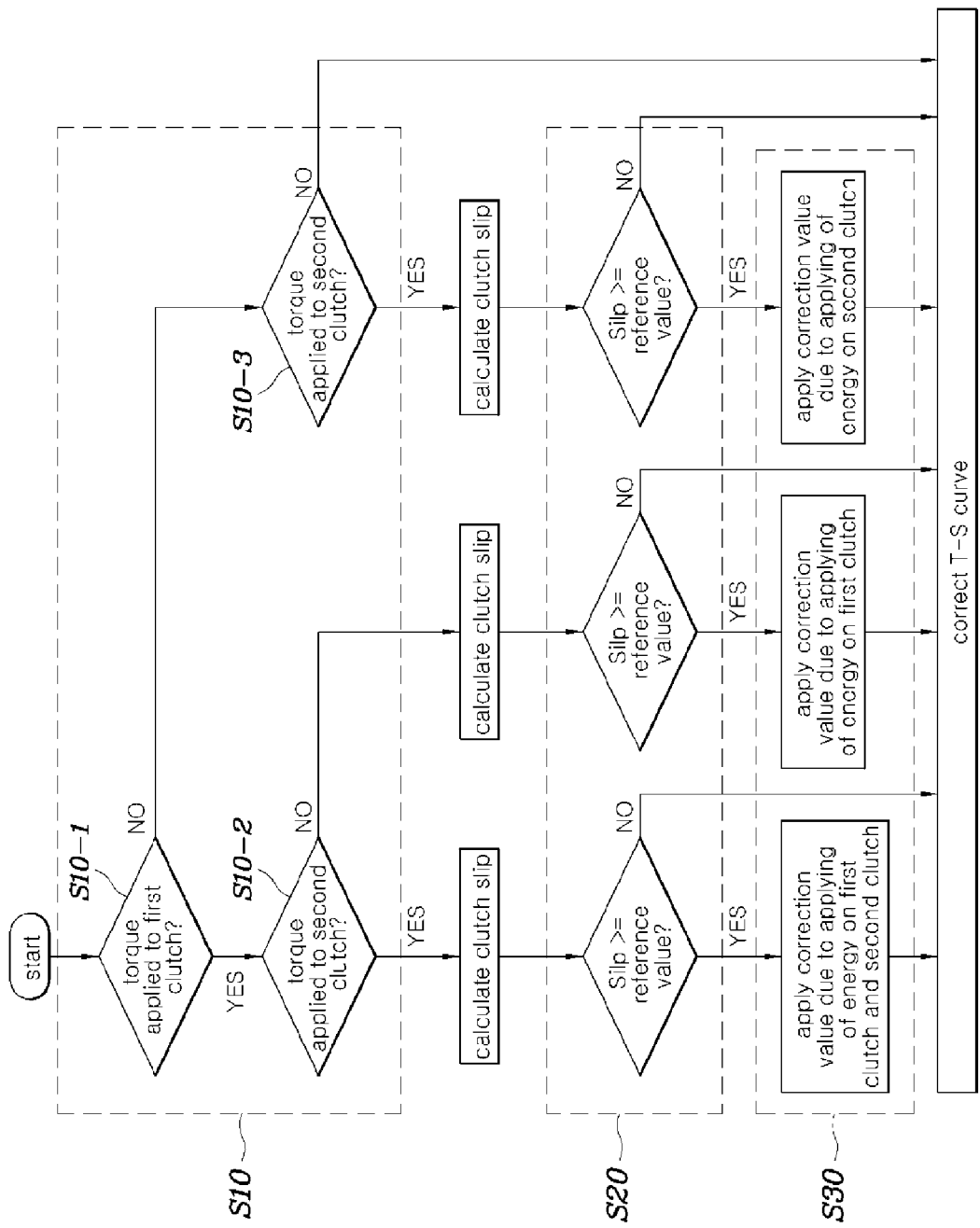
FIG. 2 is a flowchart illustrating an exemplary method for correcting a clutch characteristic of a DCT according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a method for correcting a clutch characteristic of a DCT of the present invention includes: a torque situation determining step S10 that determines whether torque is applied to any one or both of a first clutch and a second clutch; a slip determining step S20 that determines whether the amount of slip of the clutch receiving torque is a predetermined level or more; and a correcting step S30 that corrects a T-S curve of the clutch in accordance with the situation determined by the torque situation determining step S10, when the amount of slip of the clutch is the predetermined level or more, as the result of the slip determining step S20.

That is, the present invention makes it possible to improve the durability of clutches and the quality of shifting, consequently, the merchantability of a vehicle by acquiring a more exact T-S curve according to the situation around the vehicle, by discriminating the situation when torque is applied to the first clutch and the second clutch of a DCT from the situation when torque is applied to both of them and by correcting the T-S curve in accordance with the discriminated situations.

In various embodiments, the torque situation determining step Sb performs or includes: a first determining process S10-1 that determines whether torque is applied to the first clutch; a second determining process S10-2 that determines whether torque is applied to the second clutch, when torque is applied to the first clutch, as result of the first determining process S10-1; and a third determining process S10-3 that determines whether torque is applied to the second clutch, when torque is not applied to the first clutch, as the result of the first determining process S10-1, in which the step determines that torque is applied to both the first clutch and the second clutch, when torque is applied to the second clutch too and determines that torque is applied only to the first clutch, when torque is not applied to the second clutch, as the result of the second determining process S10-2, and determines that torque is applied only to the second clutch, when torque is applied to the second clutch, as the result of the third determining process S10-3, thereby determining total three situations.

The situation when torque is applied only to the first clutch or the situation when torque is applied only to the second clutch corresponds to start or kick-down shifting of a vehicle, in which slip of any one of the two clutches is controlled and energy is applied only to the corresponding clutch. Further, the situation when torque is applied to both the first clutch and the second clutch corresponds to a shifting situation, in which any one of the two clutches is controlled to be disengaged by reducing the torque and the other one is controlled to be engaged by increasing the torque, so that both of the clutches slip.

As described above, the reason why differently correcting the T-S curves of the clutches in accordance with the situation when torque is applied to the clutches is for correcting the T-S curves in consideration of the characteristic of transmission torque to the stroke of any one clutch, because the characteristic depends on not only temperature, but also the situations when torque is applied to the clutch.

Figure 3:
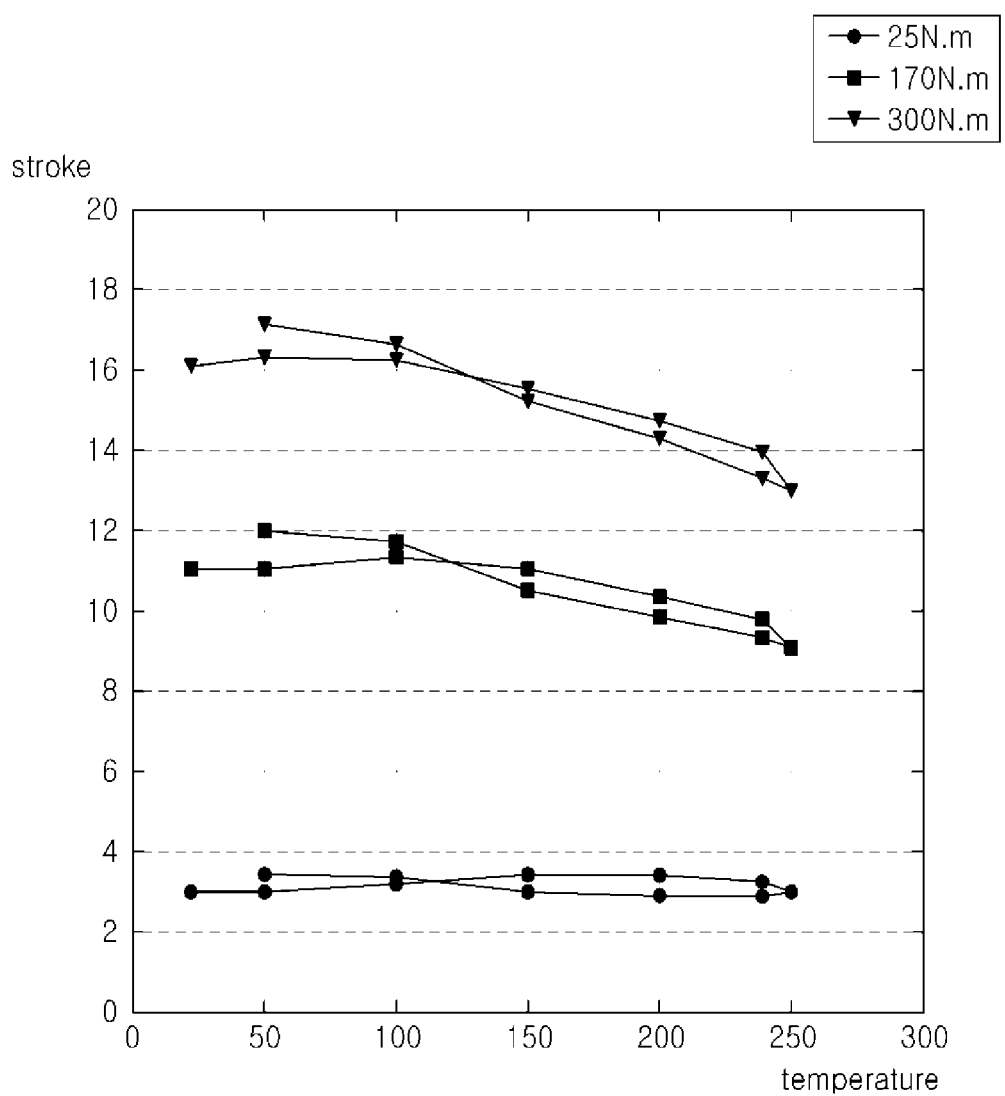
FIG. 3 is a graph showing a transmission torque characteristic of a first clutch, when torque is applied only to the first clutch.
Figure 4:
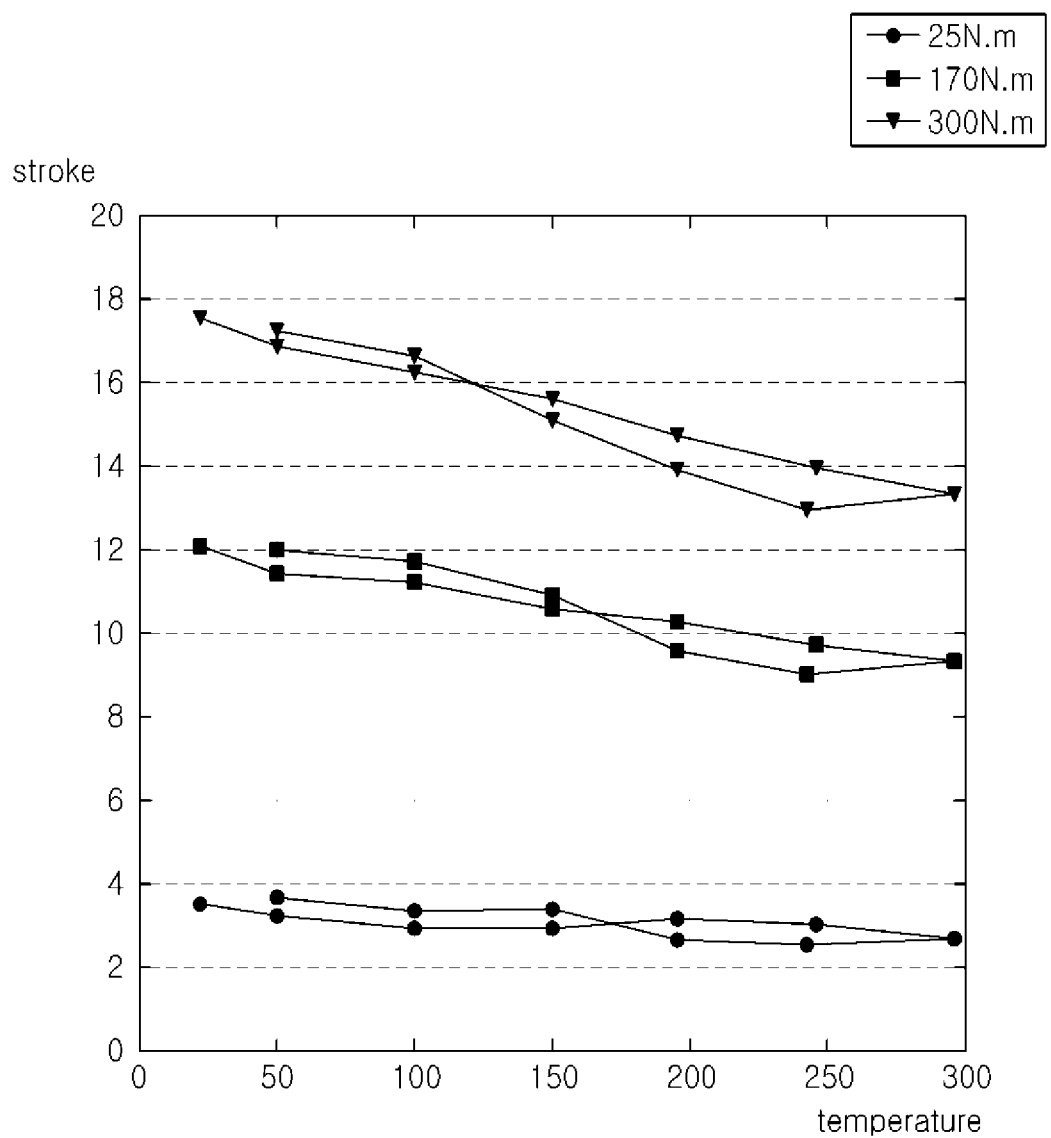
FIG. 4 is a graph showing a transmission torque characteristic of the first clutch, when torque is applied to both the first clutch and a second clutch.
Figure 5:
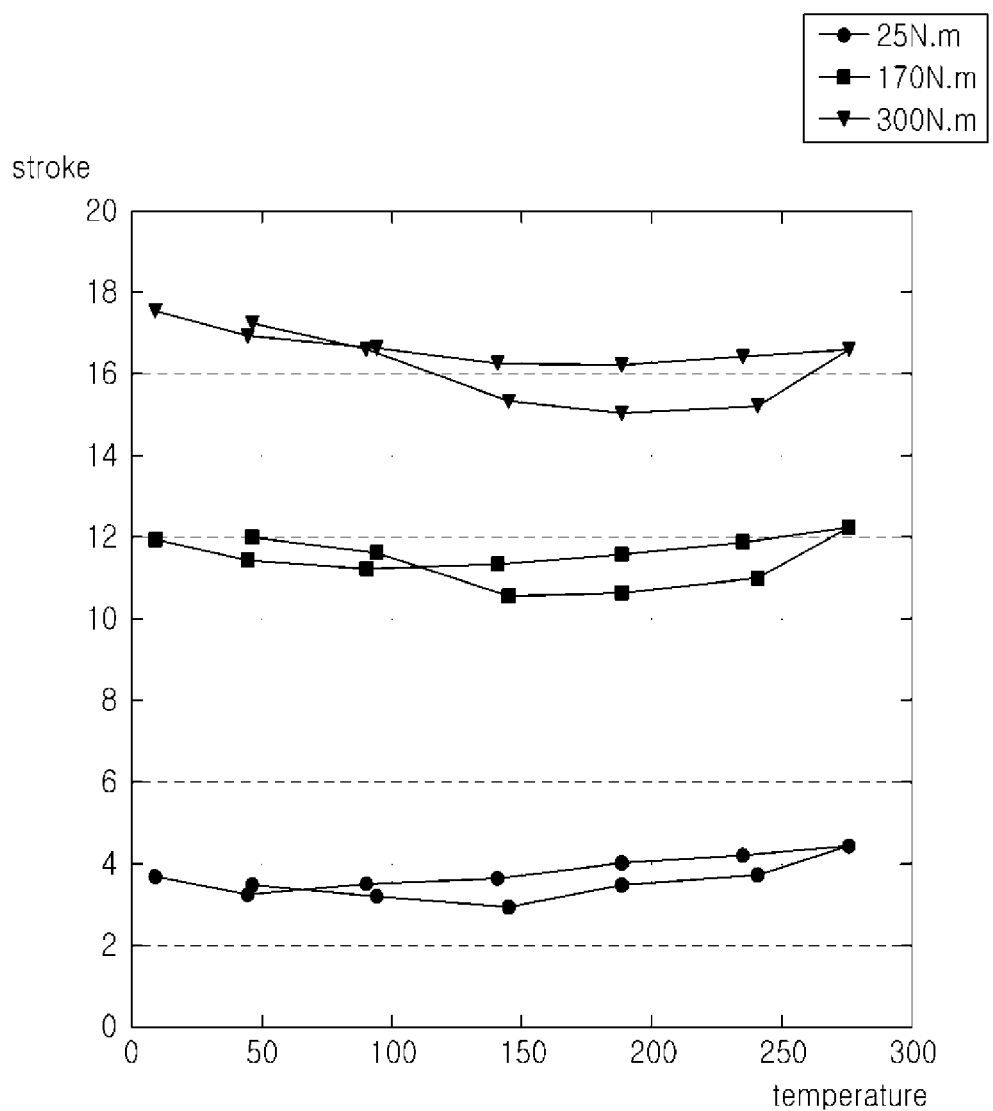
FIG. 5 is a graph showing a transmission torque characteristic of the first clutch, when torque is applied only to the second clutch.

For example, FIGS. 3 to 5 are graphs showing the transmission torque characteristic of the first clutch to the stroke, in which FIG. 3 is a graph showing the transmission torque characteristic of the first clutch, when torque is applied only to the first clutch, FIG. 4 is a graph showing the transmission torque characteristic of the first clutch, when torque is applied to both the first clutch and the second clutch, and FIG. 5 is a graph showing the transmission torque characteristic of the first clutch, when torque is applied only to the second clutch. All the figures show the transmission torque characteristics of the first clutch and the characteristics considerably change in accordance with the situations when torque is applied to the clutches, so it would be possible to achieve more appropriate correction by correcting the T-S curve of the first clutch, depending on the situations determined by the torque situation determining step S10, in consideration of the changes in characteristics.

Accordingly, in the correcting step S30, the T-S curve of a clutch is corrected in consideration of the correction values that are individually given in accordance with the situations determined in the torque situation determining step S10.

The correction values are individually set and used for each situation so that the transmission torque characteristics according to temperature in each situation such as those shown in FIGS. 3 to 5 can be considered. That is, if the torque situation determining step S10 determines that torque is applied only to the second clutch, the T-S curve of the first clutch is corrected by applying the correction value that is set in advance to fit the situation.

Further, in the correcting step S30, it may be possible to correct the T-S curves of the corresponding clutches, using a method of changing an inclination of the T-S curves using the correction value for each situation. Further, in the slip determining step S20, the reference value, which is a value set to show whether energy as much as a need of correction on the T-S curve is applied to the corresponding clutch, may be determined in advance from several times of tests.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for correcting a clutch characteristic of a double clutch transmission (DCT), the method comprising:
   a torque situation determining step, by a controller of the DCT, that determines whether a torque is applied to any one or both of a first clutch and a second clutch;
   a slip determining step, by the controller, that determines whether an amount of slip of a clutch receiving the torque is equal to or more than a predetermined reference value; and
   a correcting step, by the controller, that corrects a Torque-Stroke (T-S) curve of the clutch in accordance with situations determined in the torque situation determining step, when the amount of slip of the clutch is equal to or more than the predetermined reference value,
   wherein the torque situation determining step includes:
      a first determining process that determines whether the torque is applied to the first clutch;
      a second determining process that determines whether the torque is applied to the second clutch, when it is determined that the torque is applied to the first clutch in the first determining process; and
      a third determining process that determines whether the torque is applied to the second clutch, when it is determined that the torque is not applied to the first clutch in the first determining process, and
   wherein the torque situation determining step determines that the torque is applied to both the first clutch and the second clutch when it is determined in the second determining process that the torque is applied to the second clutch, determines that the torque is applied only to the first clutch when it is determined in the second determining process that the torque is not applied to the second clutch, and determines that the torque is applied only to the second clutch when it is determined in the third determining process that the torque is applied to the second clutch, thereby differentiating at least three situations.

2. The method of claim 1, wherein in the correcting step, the T-S curve of the clutch is corrected based on correction values that are individually given in accordance with the situations determined in the torque situation determining step.

3. The method of claim 2, wherein in the correcting step, an inclination of the T-S curve of the clutch is changed by the correction value for each situation.

4. The method of claim 1, wherein in the slip determining step, the predetermined reference value is a value set to show whether energy as much as the need of correction on the T-S curve is applied to the corresponding clutch.

* * * * *